(12) United States Patent
Li et al.

(10) Patent No.: US 12,047,141 B2
(45) Date of Patent: Jul. 23, 2024

(54) CHANNEL STATE PROCESSING METHOD AND APPARATUS, SYSTEM, TERMINAL, BASE STATION, AND STORAGE MEDIUM

(71) Applicant: ZTE CORPORATION, Shenzhen (CN)

(72) Inventors: Yong Li, Shenzhen (CN); Hao Wu, Shenzhen (CN); Zhaohua Lu, Shenzhen (CN); Yijian Chen, Shenzhen (CN); Huahua Xiao, Shenzhen (CN); Yuxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 720 days.

(21) Appl. No.: 17/263,633

(22) PCT Filed: Jul. 26, 2019

(86) PCT No.: PCT/CN2019/097817
§ 371 (c)(1),
(2) Date: Jan. 27, 2021

(87) PCT Pub. No.: WO2020/020321
PCT Pub. Date: Jan. 30, 2020

(65) Prior Publication Data
US 2021/0194559 A1 Jun. 24, 2021

(30) Foreign Application Priority Data
Jul. 27, 2018 (CN) .......................... 201810848376.6

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0456* (2013.01); *H04L 5/0048* (2013.01); *H04W 24/10* (2013.01)

(58) Field of Classification Search
CPC .. H04B 7/0626; H04B 7/0456; H04B 7/0663; H04B 17/309; H04L 5/0048; H04W 24/10; H04W 24/08; Y02D 30/70
(Continued)

(56) References Cited

U.S. PATENT DOCUMENTS 8,953,725 B1 * 2/2015 Lee .................... H04B 7/15585
375/346
10,498,507 B2 * 12/2019 Onggosanusi ........ H04L 5/0053
(Continued)

FOREIGN PATENT DOCUMENTS

CN 101304300 A 11/2008
CN 102244886 A 11/2011
(Continued)

OTHER PUBLICATIONS

European Search Report, dated Mar. 30, 2022. pp. 1-8.
(Continued)

*Primary Examiner* — Thuong Nguyen
(74) *Attorney, Agent, or Firm* — BOND, SCHOENECK & KING, PLLC; George R. McGuire

(57) ABSTRACT

Provided are a channel state processing method and apparatus, a system, a terminal, a base station, and a storage medium. The method includes: receiving a configuration parameter sent by the base station; determining channel state information according to the configuration parameter; vectorizing the channel state information, and determining a reference vector coefficient for the channel state information; determining, according to the reference vector coefficient, a vector coefficient variation of the vectorized channel (Continued)

state information; and reporting the vector coefficient variation and the reference vector coefficient separately.

15 Claims, 4 Drawing Sheets

(51) Int. Cl.
*H04L 5/00* (2006.01)
*H04W 24/10* (2009.01)
(58) Field of Classification Search
USPC .......................................................... 370/329
See application file for complete search history.

(56) References Cited

U.S. PATENT DOCUMENTS

| | | | | |
|---|---|---|---|---|
| 10,742,272 | B2* | 8/2020 | Wu | H04B 7/0634 |
| 2005/0099907 | A1* | 5/2005 | Sawada | G11B 20/10481 |
| | | | | 369/59.16 |
| 2006/0009162 | A1* | 1/2006 | Tan | H01Q 3/267 |
| | | | | 455/67.11 |
| 2006/0140295 | A1* | 6/2006 | Jeong | H04L 25/03159 |
| | | | | 375/346 |
| 2006/0234386 | A1* | 10/2006 | Burns | A61B 5/14546 |
| | | | | 600/504 |
| 2007/0057718 | A1* | 3/2007 | Coulson | H04L 27/2657 |
| | | | | 327/551 |
| 2010/0260248 | A1* | 10/2010 | Hung | H04L 25/022 |
| | | | | 455/67.11 |
| 2012/0189075 | A1* | 7/2012 | Wang | H04B 7/0626 |
| | | | | 375/267 |
| 2013/0003802 | A1* | 1/2013 | Doron | H04L 25/0248 |
| | | | | 375/224 |
| 2013/0100911 | A1* | 4/2013 | Lv | H04W 72/21 |
| | | | | 370/329 |
| 2014/0244210 | A1* | 8/2014 | Cobbin | G01B 21/22 |
| | | | | 702/151 |
| 2015/0124731 | A1* | 5/2015 | Tsuboi | H04L 5/0048 |
| | | | | 370/329 |
| 2015/0381255 | A1* | 12/2015 | Kuo | H04L 5/0005 |
| | | | | 370/329 |
| 2016/0050006 | A1 | 2/2016 | Ko et al. | |
| 2016/0119167 | A1* | 4/2016 | Abe | H04L 25/022 |
| | | | | 375/232 |
| 2017/0047954 | A1* | 2/2017 | Tian | H04B 1/0475 |
| 2017/0164226 | A1* | 6/2017 | Wei | H04L 1/0026 |
| 2017/0318150 | A1* | 11/2017 | Tsiaflakis | H04L 1/0009 |
| 2019/0115960 | A1* | 4/2019 | Jiang | H04B 7/065 |
| 2019/0334592 | A1* | 10/2019 | Han | H04B 7/0417 |
| 2019/0334596 | A1* | 10/2019 | Li | H04B 7/0634 |
| 2020/0274601 | A1* | 8/2020 | Ku | H04L 1/0026 |
| 2021/0194559 | A1* | 6/2021 | Li | H04B 7/0663 |
| 2022/0385435 | A1* | 12/2022 | Li | H04B 7/0632 |

FOREIGN PATENT DOCUMENTS

| | | |
|---|---|---|
| CN | 103312388 A | 9/2013 |
| CN | 103516481 A | 1/2014 |
| CN | 107294585 A | 10/2017 |
| CN | 107294642 A | 10/2017 |
| CN | 107888265 A | 4/2018 |
| CN | 108288984 A | 7/2018 |
| WO | 2017014609 A1 | 1/2017 |
| WO | 2018028256 A1 | 2/2018 |

OTHER PUBLICATIONS

Translated Chinese Office Action, dated Apr. 28, 2022. pp. 1-10.
Supplemental Search Report, p. 1 of 1.
On the channel reciprocity support for CSI acquisition. Nokia, Alcatel-Lucent Shanghai Bell, Athens, Greece Feb. 13-17, 2017. 3GPP TSG-RAN WG1 #88, R1-1703176, pp. 1-2.
Translated Chinese First Search Report.
Translated Chinese Office Action, dated Nov. 10, 2021.
International Search Report Form PCT/ISA/210, and Written Opinion Form PCT/ISA/237, International Application No. PCT/CN2019/097817, pp. 1-6 International Filing Date Jul. 26, 2019 mailing date of search report Oct. 25, 2019.

* cited by examiner

CHANNEL STATE PROCESSING METHOD AND APPARATUS, SYSTEM, TERMINAL, BASE STATION, AND STORAGE MEDIUM

CROSS-REFERENCES TO RELATED APPLICATIONS

This is a National Stage Application, filed under 35 U.S.C. 371, of International Patent Application No. PCT/CN2019/097817, filed on Jul. 26, 2019, which is based on and claims priority to Chinese Patent Application No. 201810848376.6 filed with the CNIPA on Jul. 27, 2018, the disclosure of which is incorporated herein by reference in its entirety.

TECHNICAL FIELD

The present disclosure relates to, but is not limited to, the field of communications and, in particular, relates to, but is not limited to, a channel state processing method and apparatus, a system, a terminal, a base station, and a storage medium.

BACKGROUND

In multi-antenna wireless communication technologies, the precoding technology aims at improving communication performance by performing precoding on transmit antennas. Generally, a transmitting side transmits one reference signal (RS) on one resource, and a receiving side measures channel state information (CSI) using the reference signal and then feeds the measured CSI back in a precoding form. The receiving side generally feeds the CSI back through a precoding matrix indicator (PMI). To improve the accuracy with which the receiving side feeds the CSI back in the precoding form, the precoding includes a linear combination of multiple vectors. The feedback of precoding information by the receiving side is implemented by feeding back the vectors constituting the precoding and the coefficients of the vectors. The coefficient of the vector includes an amplitude of the coefficient and a phase of the coefficient.

In the related art, the receiving side determines the vectors constituting the precoding and then feeds the amplitudes and the phases of the corresponding vectors back to the transmitting side. Each time the receiving side reports the coefficients of the vectors to the transmitting side, all the coefficients of the vectors for the precoding are reported. Such a reporting method will occupy a large number of reporting resources, reduce a resource utilization rate, and reduce the accuracy with which the CSI is reported. Meanwhile, the energy consumption of a terminal reporting reports is also increased.

SUMMARY

The embodiments of the present disclosure provide a channel state processing method and apparatus, a system, a terminal, a base station, and a storage medium, so as to solve the problem of a relatively low resource utilization rate due to too many resources occupied by precoding coefficients reported by a channel state information reporting method in the related art.

An embodiment of the present disclosure provides a channel state processing method applied to a terminal. The method includes steps described below.

A configuration parameter sent by a base station is received.

Channel state information is determined according to the configuration parameter.

The channel state information is vectorized, and a reference vector coefficient for reporting the channel state information is determined.

A vector coefficient variation of the vectorized channel state information is determined according to the reference vector coefficient.

The vector coefficient variation and the reference vector coefficient are reported separately.

An embodiment of the present disclosure further provides a channel state processing method applied to a base station. The method includes steps described below.

A configuration parameter is generated, where the configuration parameter is used for instructing and controlling a terminal to report channel state information.

The configuration parameter is delivered to the terminal.

A report reported by the terminal is received, where the report includes a reference vector coefficient or a vector coefficient variation after the channel state information determined by the terminal according to the configuration parameter is vectorized, and the reference vector coefficient and the vector coefficient variation are separately received from different reports.

An embodiment of the present disclosure further provides a channel state information reporting apparatus. The apparatus includes a first receiving module, a measurement module, a conversion module, a computation module, and a first sending module.

The first receiving module is configured to receive a configuration parameter sent by a base station.

The measurement module is configured to determine channel state information to be fed back according to the configuration parameter.

The conversion module is configured to vectorize the channel state information and determine a reference vector coefficient for reporting the channel state information.

The computation module is configured to determine, according to the reference vector coefficient, a vector coefficient variation of the vectorized channel state information.

The first sending module is configured to report the vector coefficient variation and the reference vector coefficient separately.

An embodiment of the present disclosure further provides a terminal. The terminal includes a first main control unit and the channel state information reporting apparatus described above. The reporting apparatus performs, under the control of the first main control unit, steps described below.

A configuration parameter sent by a base station is received.

Channel state information is determined according to the configuration parameter.

The channel state information is vectorized, and a reference vector coefficient for reporting the channel state information is determined.

A vector coefficient variation of the vectorized channel state information is determined according to the reference vector coefficient.

The vector coefficient variation and the reference vector coefficient are reported separately.

An embodiment of the present disclosure further provides a channel state information receiving apparatus. The apparatus includes a generation module, a second sending module, and a second receiving module.

The generation module is configured to generate a configuration parameter, where the configuration parameter is used for instructing and controlling a terminal to report channel state information.

The second sending module is configured to deliver the configuration parameter to the terminal.

The second receiving module is configured to receive a report reported by the terminal, where the report includes a reference vector coefficient or a vector coefficient variation after the channel state information to be fed back determined by the terminal according to the configuration parameter is vectorized, and the reference vector coefficient and the vector coefficient variation are separately received from different reports.

An embodiment of the present disclosure further provides a base station. The base station includes a second main control unit and the channel state information receiving apparatus described above. The receiving apparatus performs, under the control of the second main control unit, steps described below.

A configuration parameter is generated, where the configuration parameter is used for instructing and controlling a terminal to report channel state information.

The configuration parameter is delivered to the terminal.

A report reported by the terminal is received, where the report includes a reference vector coefficient or a vector coefficient variation after the channel state information determined by the terminal according to the configuration parameter is vectorized, and the reference vector coefficient and the vector coefficient variation are separately received from different reports.

An embodiment of the present disclosure further provides a communication system. The communication system includes the terminal described above and the base station described above, where the terminal is provided with a reporting apparatus, and the base station is provided with a receiving apparatus.

The receiving apparatus is configured to generate a configuration parameter and deliver the configuration parameter to the reporting apparatus, where the configuration parameter is used for triggering and controlling the terminal to report channel state information.

The reporting apparatus is configured to receive the configuration parameter sent by the receiving apparatus, determine the channel state information according to the configuration parameter, vectorize the channel state information and determine a reference vector coefficient for reporting the channel state information, determine, according to the reference vector coefficient, a vector coefficient variation of the vectorized channel state information, and report the reference vector coefficient and the vector coefficient variation separately to the receiving apparatus.

The receiving apparatus is configured to receive a report reported by the reporting apparatus, where the report includes a reference vector coefficient or a vector coefficient variation after the channel state information to be fed back determined by the reporting apparatus according to the configuration parameter is vectorized, and the reference vector coefficient and the vector coefficient variation are separately received from different reports.

An embodiment of the present disclosure further provides a communication apparatus. The communication apparatus includes a processor, a memory, and a communication bus.

The communication bus is configured to implement a communication connection between the processor and the memory.

The processor is configured to execute one or more first programs stored in the memory to implement the channel state processing method described above.

The processor is configured to execute one or more second programs stored in the memory to implement the channel state processing method described above.

An embodiment of the present disclosure further provides a computer-readable storage medium. The computer-readable storage medium stores one or more first computer programs and one or more second computer programs. The one or more first computer programs are executable by one or more processors to implement the channel state processing method described above.

The one or more second computer programs are executable by the one or more processors to implement the channel state processing method described above.

According to the channel state processing method and apparatus, the system, the terminal, the base station, and the storage medium provided by the embodiments of the present disclosure, a terminal side performs channel measurement according to the configuration parameter sent by the base station and determines the corresponding channel state information; and the terminal vectorizes the channel state information, determines the reference vector coefficient for the channel state information, computes, according to the reference vector coefficient, the vector coefficient variation of the channel state information to be fed back, and finally reports the vector coefficient variation and the reference vector coefficient to the base station separately. The terminal reports the measured channel state information to be reported separately in a set way that the reference vector coefficient and the vector coefficient variation are reported, and the vector coefficient variation is a variation relative to the reference vector coefficient. In a reporting process, a report of the reference vector coefficient is a complete information report, and other reports are to only report variations relative to a reference. Compared with the reporting method in the related art, the report in the present application only needs to report the vector coefficient variation to reflect a channel variation without repeatedly reporting the unchanged channel coefficient reference, that is, it is unnecessary to report an unchanged channel part, thereby saving vector coefficient reporting overheads and channel state information reporting overheads, and improving the utilization rate of reporting resources.

DETAILED DESCRIPTION

To illustrate the objects, technical solutions, and advantages of the present application clearer, the embodiments of the present disclosure are further described below in detail through specific implementations in conjunction with the drawings. It is to be understood that the embodiments described herein are merely intended to explain the present application and not to limit the present application.

Embodiment One

In a channel state information reporting method in the related art, a report reported each time is a complete report, and this completed report includes common content and changed content. It can be seen that the report reported each time includes a large volume of data and needs to occupy a large number of resources in the related art, resulting in too large an overhead of the reported report and a waste of resources. In view of this, in the embodiments of the present disclosure, a reporting reference is set, a variation is determined according to the reference, the reference and the variation are reported through different reports, and a report in which the variation is reported does not include the unchanged reference, which greatly reduces reporting resources occupied each time the channel state information is reported and can improve reporting efficiency, reduces resource occupancy, and improve a resource utilization rate.

Figure 1:
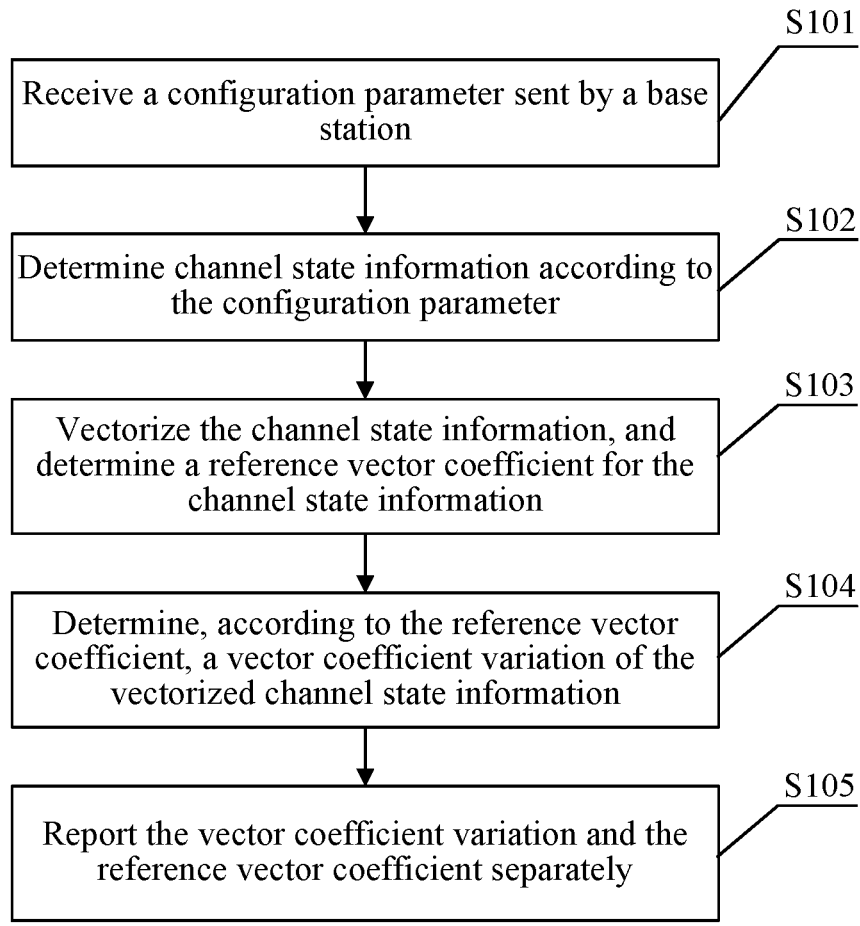
FIG. 1 is a flowchart of a channel state processing method according to embodiment one of the present disclosure.

A channel state processing method provided by this embodiment is shown in FIG. 1. The processing method in this embodiment may be understood as a channel state information reporting method and is mainly applied to a terminal side. In practical applications, channel measurement is mainly implemented by an operating terminal, and an instruction of measurement and an instruction of reporting are completed by a base station through a configuration parameter. Specifically, the method includes steps described below.

In S101, the configuration parameter sent by the base station is received.

In this embodiment, the configuration parameter here at least includes at least includes information about a measurement reference signal. The information about the measurement reference signal is configured and delivered by the base station. When a terminal measures channel state information, specifically measurement and reporting are performed according to the measurement reference signal.

In practical applications, the configuration parameter further includes control parameters capable of implementing complete channel measurement and reporting, such as frequency domain to which the terminal's measurement is limited, the number of vectors that need to be reported by the terminal, a report setting in which reports are reported, a type of the report setting.

In S102, the channel state information is determined according to the configuration parameter.

In this embodiment, when the terminal determines the channel state information according to the configuration parameter, specifically, the corresponding channel state information may be measured through the measurement reference signal delivered by the base station.

In S103, the channel state information is vectorized, and a reference vector coefficient for the channel state information is determined.

In practical applications, the terminal reports the channel state information by means of a vector, and this vector refers to a vector related to the channel state information. For example, a linear combination of vectors is used for representing a channel coefficient matrix or a matrix correlated to the channel coefficient matrix or an eigenvector matrix or a precoding matrix. A vector set is predefined; or a vector structure is predefined and the formation of specific vectors is controlled by a parameter; or a candidate vector is predefined; or a candidate vector structure is predefined and the formation of specific candidate vectors is controlled by a parameter. In the case where the vectors for the linear combination are determined, the coefficients of the vectors for the linear combination are fed back by the terminal.

In this embodiment, vectorization refers to that the channel state information is embodied in the form of the coefficients of the vectors participating in the combination or a coefficient matrix of the vectors participating in the combination, that is, the vectors that embody the channel state information and the coefficients of these vectors are determined, which facilitates the terminal's reporting. The channel state information to be fed back is vectorized, which specifically means that the vectors that embody the channel state information are selected from preset candidate vectors, and the coefficients of these vectors are determined. The reference vector coefficient for reporting the channel state information is determined, where the reference vector coefficient is used as the reference to determine a variation of the same vector coefficient to embody a variation of the channel state information.

In S104, a vector coefficient variation of the vectorized channel state information is determined according to the reference vector coefficient.

To determine the vector coefficient variation of the channel state information is to determine a variation of a vector coefficient of the channel state information. For example, if a coefficient of the same vector varies in two reports, a variation of a vector coefficient in a latter report relative to a vector coefficient in a former report needs to be determined.

In this step, when the vector coefficient variation of the channel state information is computed, there are two specific cases.

In case one, when the determined reference vector coefficient is in the channel state information, the channel state information specified as a reference is computed to obtain a vector coefficient of the channel state information, and the vector coefficient is used as the reference vector coefficient. The rest channel state information is computed based on the reference vector coefficient, that is, the vector coefficient variation is computed for the rest channel state information.

In case two, when the determined reference vector coefficient is not in the channel state information to be fed back by the terminal, the computation of the vector coefficient variation in this step is to compute variations of all the channel state information to be fed back relative to the reference vector coefficient.

In S105, the vector coefficient variation and the reference vector coefficient are reported separately.

In this step, the vector coefficient variation and the reference vector coefficient are specifically reported in the form of reports, and a report for reporting the vector coefficient variation and a report for reporting the reference vector coefficient are different reports.

In this embodiment, the vector coefficient variation and the reference vector coefficient have to be reported through different reports, that is, the vector coefficient variation and the reference vector coefficient cannot be reported in the same report. The process of reporting a report of the channel state information may specifically be implemented in manners described below.

In manner one, the reference vector coefficient and the vector coefficient variation are transmitted and reported based on different reports in the same report setting, that is, specific processing steps in the reporting process are as follows: a current report setting in which the terminal reports the channel state information needs to be determined, and the report of the reference vector coefficient and the report of the vector coefficient variation are separately reported to the base station according to the current report setting, that is, the report of the reference vector coefficient and reports of all vector coefficient variations are reported in the determined current report setting.

In this manner, when the reference vector coefficient and the vector coefficient variation are reported in the same report setting, a report of a reference vector coefficient corresponding to the measurement reference signal and a report of a vector coefficient variation corresponding to the measurement reference signal may be reported according to a chronological order of the received measurement reference signal, where the report of the reference vector coefficient has priority over the report of the vector coefficient variation.

In manner two, the report of the reference vector coefficient and the report of the vector coefficient variation are separately reported to the base station on different slots in the report setting.

In this manner, the reference vector coefficient and the vector coefficient variation are reported based on a timing sequence of operating slots and the report setting in this manner may be the same report setting or different report settings. Regardless of the same report setting or different report settings, the reference vector coefficient and the vector coefficient variation have to be reported on different slots. A specific processing process is described below.

The timing sequence of the operating slots in the report setting of the terminal that reports the channel state information needs to be determined, and the report of the reference vector coefficient and the report of the vector coefficient variation are reported to the base station in sequence according to the timing sequence of the operating slots.

In this embodiment, when the configuration parameter at least includes the information about the measurement reference signal for the channel state information and the report setting, in the report setting, the report of the reference vector coefficient corresponding to the measurement reference signal and the report of the vector coefficient variation corresponding to the measurement reference signal are reported according to a chronological order of the received information about the measurement reference signal, where the report of the reference vector coefficient has priority over the report of the vector coefficient variation.

In this embodiment, the reports may also be reported in different categories according to the type of the report setting, that is, before the reports are reported, the method further includes: detecting the type of the current report setting, where the type includes an aperiodic report setting, a periodic report setting, and a semi-persistent report setting.

The type of the report setting in which the reports are reported may be directly acquired from the configuration parameter delivered by the base station.

The step in which the reference vector coefficient and the vector coefficient variation are reported through different reports includes: if the report setting is the aperiodic report setting, transmitting the report of the reference vector coefficient to the base station; and if the report setting is the periodic report setting or the semi-persistent report setting, transmitting the report of the vector coefficient variation to the base station.

In the embodiments of the present application, the reference vector coefficient may specifically be determined in manners described below.

In manner one, historical records of channel state information reported by the terminal that reports the channel state information are acquired, and a vector coefficient reported at a time moment closest to a current moment is selected from the historical records as the reference vector coefficient. Specifically, a report reported by the terminal for the last time in a previous period is used as the vector coefficient reference for transmitting channel state information, and variations of the current channel state information to be reported relative to the reference are computed according to the reference and reported one by one.

In this manner, the terminal may report the reference again; or the terminal only reports the variation rather than the reference, but the base station needs to be notified of the reference, which may be implemented through a negotiation between the terminal and the base station.

In manner two, a reported report indicated by trigger signaling delivered by the base station is determined, and a vector coefficient in the reported report indicated by the trigger signaling is extracted as the reference vector coefficient, where the trigger signaling at least includes one of: downlink control information (DCI) signaling, DCI format signaling, acknowledgement (ACK) signaling, or non-acknowledgement (NCK) signaling.

In this embodiment, the base station can identify whether a report received by the base station and reported by the terminal is the report of the reference vector coefficient or the report of the vector coefficient variation. Before the terminal reports the report and after the vector coefficient variation of the vectorized channel state information is determined according to the reference vector coefficient, the method further includes setting a status indicator bit. The status indicator bit is reported together with a vector coefficient to the base station, and then the base station determines whether the reference vector coefficient or the vector coefficient variation is transmitted in the report received this time according to the status indicator bit in the report. In practical applications, the status indicator bit is part of the channel state information or a kind of flag information for the report, that is, the status indicator bit is set in the reported report to indicate whether the vector coefficient carried in the report is the vector coefficient variation or the reference vector coefficient.

In the channel state processing method in this embodiment, the terminal reports the measured channel state information to be reported separately in a set way that the reference vector coefficient and the vector coefficient variation are reported, and the vector coefficient variation is the variation relative to the reference vector coefficient. In a reporting process, the report of the reference vector coefficient is a complete information report, and other reports are to only report variations relative to the reference, thereby avoiding excessive resources occupied by the reports and improving the resource utilization rate.

Embodiment Two

Figure 2:
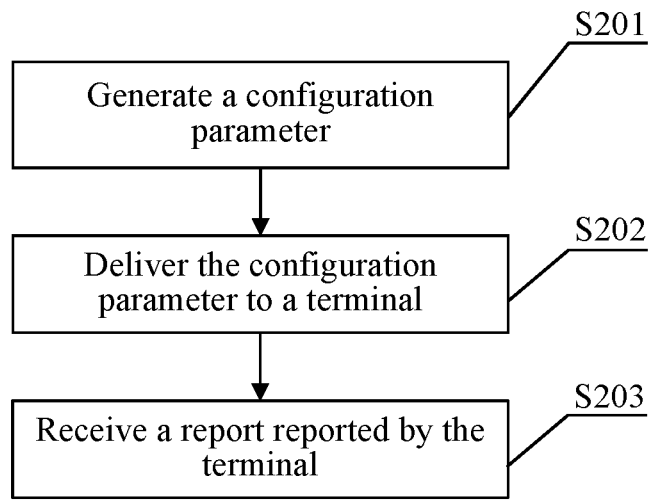
FIG. 2 is a flowchart of a channel state processing method according to embodiment two of the present disclosure.

This embodiment provides a channel state processing method. As shown in FIG. 2, the processing method in this embodiment may be understood as a channel state information receiving method and is mainly applied to a base station side, and specifically, the method includes steps described below.

In S201, a configuration parameter is generated.

In this step, the configuration parameter is automatically generated by a base station according to practical requirements or may be a preset general parameter. When the base station needs to acquire channel state information from a lower-level terminal, the base station automatically delivers the configuration parameter to the corresponding terminal, where the configuration parameter is specifically a control instruction for triggering and controlling the terminal to measure the channel state information and some other control parameters such as frequency domain to which the terminal's measurement is limited and the number of vectors that need to be reported by the terminal.

In S202, the configuration parameter is delivered to the terminal.

The base station may specifically deliver the configuration parameter via the Internet or broadcast the configuration parameter regularly to all terminals in an area where the base station is located in a broadcast manner.

In S203, a report reported by the terminal is received.

In this step, the report includes a reference vector coefficient or a vector coefficient variation after the channel state information determined by the terminal according to the configuration parameter is vectorized.

In this embodiment, whether the reference vector coefficient or the vector coefficient variation is transmitted in the report received by the base station is specifically determined in manners described below.

In manner one, a report setting of the terminal that reports the report is determined, and reports are received in sequence according to reporting priorities of the reference vector coefficient and the vector coefficient variation in the report setting.

That is, when it is detected that the terminal reports all reports in the same report setting, according to the priorities of the reports, the reference vector coefficient is transmitted in a report reported earlier and the vector coefficient variation is transmitted in a report reported later, that is, the content reported later is a vector variation computed based on the reference in the previous report. The base station may restore an original vector coefficient of the report from the vector coefficient variation according to this report order.

In manner two, a report of the reference vector coefficient and a report of the vector coefficient variation reported by the terminal are separately received on different slots in the report setting.

The report setting in this manner may be the same report setting or different report settings. Regardless of the same report setting or different report settings, the reference vector coefficient and the vector coefficient variation have to be received on different slots. A specific processing process is described below.

The timing sequence of operating slots in the report setting of the terminal that reports the reports is determined, and the report of the reference vector coefficient and the report of the vector coefficient variation are received in sequence according to the timing sequence of the operating slots.

In practical applications, the above two implementation manners may both be specifically determined through a negotiation between the terminal and the base station. For example, it is negotiated that regardless of what is reported, a vector coefficient transmitted in a report received for the first time in a communication period is used as a reference for all reports received by the base station in the communication period.

In this embodiment, whether the reference vector coefficient or the vector coefficient variation is transmitted in the report received by the base station may be further determined through a type of the report setting.

Specifically, the type of the report setting is detected, where the type includes an aperiodic report setting, a periodic report setting, and a semi-persistent report setting.

The step in which the report reported by the terminal is received further includes steps described below. If the report setting is the aperiodic report setting, the received report is a report for transmitting the reference vector coefficient. If the report setting is the periodic report setting or the semi-persistent report setting, the received report is a report for transmitting the vector coefficient variation.

In this embodiment, whether the reference vector coefficient or the vector coefficient variation is transmitted in the report received by the base station is determined in the above manners and may also be determined by detecting a status indicator bit in the report. The status indicator bit in the report is detected, and whether a vector coefficient transmitted in the report varies or a size of the vector coefficient variation transmitted in the report is determined according to the status indicator bit.

When it is detected that the status indicator bit is 1, it indicates that the vector coefficient has varied; when the status indicator bit is 0, it indicates that the vector coefficient has not varied. Alternatively, when it is detected that the status indicator bit is 0, it indicates that the vector coefficient has varied; when the status indicator bit is 1, it indicates that the vector coefficient has not varied.

In the channel state processing method in this embodiment, the channel state information reported by the terminal is reported separately in a set way that the reference vector coefficient and the vector coefficient variation are reported, and the vector coefficient variation is the variation relative to the reference vector coefficient. In a reporting process, the report of the reference vector coefficient is a complete information report, and other reports are to only report variations relative to the reference. Therefore, the method avoids excessive resources occupied when the terminal reports, reduces resource occupancy when a receiving end receives reports, reduces an information reading and parsing amount, greatly reduces the energy consumption of the receiving end, and improves the resource utilization rate of the receiving end.

Embodiment Three

Figure 3:
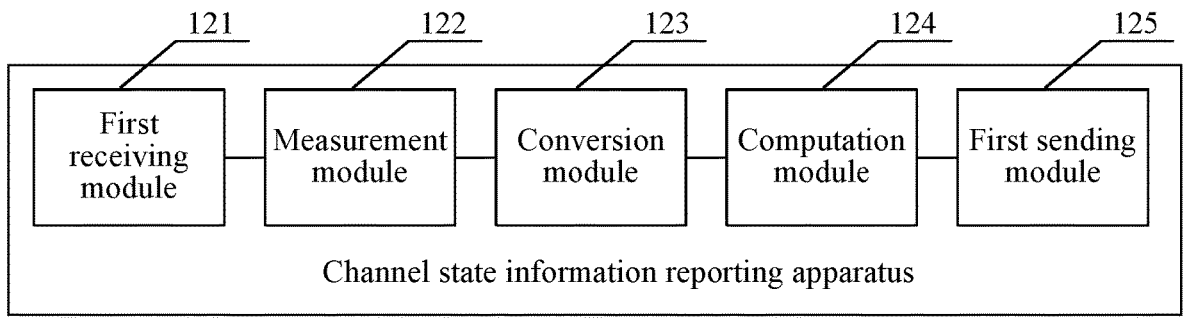
FIG. 3 is a structural diagram of a channel state information reporting apparatus according to embodiment three of the present disclosure.

This embodiment provides a channel state information reporting apparatus which may be applied to various mobile terminals. As shown in FIG. 3, the apparatus includes a first receiving module 121, a measurement module 122, a conversion module 123, a computation module 124, and a first sending module 125. The first receiving module 121 is configured to receive a configuration parameter sent by a base station. The measurement module 122 is configured to determine channel state information according to the configuration parameter. The conversion module 123 is configured to vectorize the channel state information and determine a reference vector coefficient for reporting the channel state information.

In this embodiment, vectorization refers to that the channel state information is embodied in the form of coefficients of vectors participating in a combination or a coefficient matrix of the vectors participating in the combination, that is, the vectors that embody the channel state information and the coefficients of these vectors are determined, which facilitates a terminal's reporting. The channel state information to be fed back is vectorized, which specifically means that the vectors that embody the channel state information are selected from preset candidate vectors, and the coefficients of these vectors are determined. The reference vector coefficient for reporting the channel state information is determined, where the reference vector coefficient is used as the reference to determine a variation of the same vector coefficient to embody a variation of the channel state information.

The computation module 124 is configured to determine, according to the reference vector coefficient, a vector coefficient variation of the vectorized channel state information. The first sending module 125 is configured to report the vector coefficient variation and the reference vector coefficient separately.

When the first sending module 125 reports the channel state information of the terminal, the channel state information is specifically reported in the form of reports, and a report for reporting the vector coefficient variation and a report for reporting the reference vector coefficient are different reports.

In this embodiment, the configuration parameter at least includes at least includes information about a measurement reference signal. In the process of the measurement module 122 determining the channel state information to be fed back, the channel state information is specifically measured according to a received measurement reference signal. In practical applications, when the channel state information is reported, not all parameters of a measured channel are necessarily to be reported. In some cases, it is only necessary to report part of the parameters.

In practical applications, the terminal reports the channel state information by means of a vector that refers to a vector related to the channel state information. For example, a linear combination of vectors is used for representing a channel coefficient matrix or a matrix correlated to the channel coefficient matrix or an eigenvector matrix or a precoding matrix. A vector set is predefined; or a vector structure is predefined and the formation of specific vectors is controlled by a parameter; or a candidate vector is predefined; or a candidate vector structure is predefined and the formation of specific candidate vectors is controlled by a parameter. In the case where the vectors for the linear combination are determined, the coefficients of the vectors for the linear combination are fed back by the terminal. For example, control may be implemented through the configuration parameter delivered by the base station, where the configuration parameter may include parameters such as frequency domain to which the terminal's measurement is limited and the number of vectors that need to be reported by the terminal.

In this embodiment, before the conversion module 123 vectorizes the channel state information, the reference vector coefficient for reporting the channel state information may be further determined. The reference vector coefficient may specifically be determined in manners described below.

In manner one, one vector coefficient is selected from historical records reported by the reporting apparatus; specifically, a vector coefficient in a report reported at a time moment closest to a current moment is selected as a reference.

In manner two, the reference vector coefficient is determined through trigger signaling for the channel state information in the received configuration parameter. The trigger signaling at least includes one of: downlink control information (DCI) signaling, DCI format signaling, acknowledgement (ACK) signaling, or non-acknowledgement (NCK) signaling.

In practical applications, when the base station needs to acquire the channel state information from a lower-level terminal, the base station includes specified trigger signaling in the configuration parameter to trigger the corresponding terminal to perform channel measurement and the measured channel state information will be reported through a report specified in the trigger signaling. In this case, a vector coefficient reported in the report specified in the trigger signaling may be directly selected as the reference vector coefficient. In this way, it is ensured that the base station and the terminal both know reference information, and no additional negotiation and transmission need to be performed, further improving channel state information reporting efficiency and a resource utilization rate.

The conversion module 123 specifically vectorizes the channel state information to be fed back according to a preset reference. Vectorization refers to that the channel state information is embodied in the form of vector coefficients, which facilitates the terminal's reporting.

The computation module 124 computes a vector coefficient of the channel state information to be fed back by using the specified reference vector coefficient as the reference. Specifically, computations may be performed in two manners described below.

In manner one, when the determined reference vector coefficient is in the channel state information to be fed back, the channel state information specified as a reference is computed to obtain a vector coefficient of the channel state information, and the vector coefficient is used as the reference vector coefficient. The rest channel state information to be fed back is computed based on the reference vector coefficient, that is, the vector coefficient variation is computed for the rest channel state information to be fed back.

In manner two, when the determined reference vector coefficient is not in the channel state information to be fed back, the computation of the vector coefficient variation in this step is to compute variations of all the channel state information to be fed back relative to the reference vector coefficient.

In this embodiment, when the first sending module 125 reports a report, specifically, the reference vector coefficient and the vector coefficient variation may be transmitted and reported based on different reports in the same report setting, or the reference vector coefficient and the vector coefficient variation are reported in sequence based on a timing sequence of operating slots in the report setting.

In practical applications, when the reference vector coefficient and the vector coefficient variation are reported based on the same report setting, a report of a reference vector coefficient corresponding to the measurement reference signal and a report of a vector coefficient variation corresponding to the measurement reference signal may specifically be reported according to a chronological order of the received measurement reference signal, where the report of the reference vector coefficient has priority over the report of the vector coefficient variation.

Further, the reference vector coefficient and the vector coefficient variation may also be reported according to the detected type of the report setting. Specifically, a type of a current report setting is detected, where the type includes an aperiodic report setting, a periodic report setting, and a semi-persistent report setting.

If the current report setting is the aperiodic report setting, the first sending module 125 transmits the report of the reference vector coefficient to the base station.

If the report setting is the periodic report setting or the semi-persistent report setting, the first sending module 125 transmits the report of the vector coefficient variation to the base station.

In this embodiment, to be convenient for the base station to identify whether a report is the report of the reference or the report of the variation, after the vector coefficient variation of the vectorized channel state information is determined according to the reference vector coefficient, the first sending module 125 is further configured to set a status indicator bit before reporting the report and report the status indicator bit together with a vector coefficient to the base station, and then the base station determines whether the reference vector coefficient or the vector coefficient variation is transmitted in the report received this time according to the status indicator bit in the report.

The channel state information reporting apparatus in this embodiment sets the reference vector coefficient for reporting the channel state information, computes the vector coefficient variation separately for the channel state information to be reported, and reports the computed vector coefficient variation to the base station. Compared with the related art, this embodiment reports a report including a variation relative to the reference, which greatly reduces the occupancy of reporting resources, saves vector coefficient reporting overheads and channel state information reporting overheads, and improves the utilization rate of reporting resources.

Embodiment Four

Figure 4:
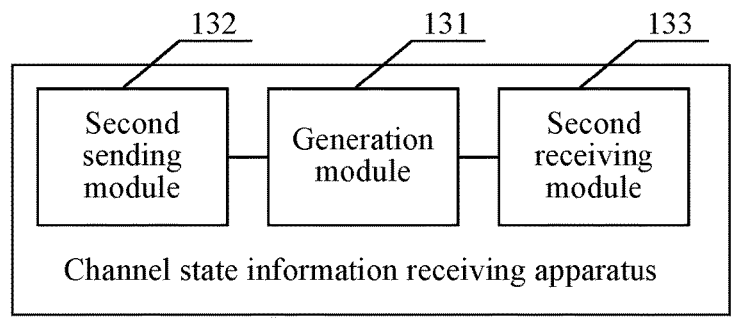
FIG. 4 is a structural diagram of a channel state information receiving apparatus according to embodiment four of the present disclosure.

This embodiment provides a channel state information receiving apparatus which is mainly applied to a base station side and configured to receive and parse a report of channel state information reported by a lower-level terminal and control the lower-level terminal to measure the channel state information. As shown in FIG. 4, the apparatus includes a generation module 131, a second sending module 132, and a second receiving module 133. The generation module 131 is configured to generate a configuration parameter, where the configuration parameter is used for instructing and controlling a terminal 10 to report the channel state information. The second sending module 132 is configured to deliver the configuration parameter to the terminal. The second receiving module 133 is configured to receive a report reported by the terminal, where the report includes a reference vector coefficient or a vector coefficient variation after the channel state information determined by the terminal according to the configuration parameter is vectorized, and the reference vector coefficient and the vector coefficient variation are separately received from different reports.

In this embodiment, the configuration parameter is automatically generated by a base station according to practical requirements or may be a preset general parameter. When the base station needs to acquire the channel state information from the lower-level terminal, the base station automatically delivers the configuration parameter to the corresponding terminal, where the configuration parameter is specifically a control instruction for triggering and controlling the terminal to measure the channel state information and some other control parameters such as frequency domain to which the terminal's measurement is limited and the number of vectors that need to be reported by the terminal.

In this embodiment, since received reports differ in that some reports transmit the reference vector coefficient and some reports transmit the vector coefficient variation, to distinguish the reports, the terminal adds a status indicator bit when reporting a report, where the status indicator bit is used for indicating whether the vector coefficient variation is in the reported report. For example, when the vector coefficient variation is transmitted, the status indicator bit in the report is set to 1. If it is set to 0, it is considered that there is no variation. The report may transmit the reference vector coefficient. Whether it is the reference vector coefficient needs to be determined in manners described below.

In manner one, a report setting of the terminal that reports the report is determined, and reports are received in sequence according to reporting priorities of the reference vector coefficient and the vector coefficient variation in the report setting.

That is, when it is detected that the terminal reports all reports in the same report setting, according to the priorities of the reports, the reference vector coefficient is transmitted in a report reported earlier and the vector coefficient variation is transmitted in a report reported later, that is, the content reported later is a vector variation computed based on the reference in the previous report. The base station may restore an original vector coefficient of the report from the vector coefficient variation according to this report order.

In manner two, a report of the reference vector coefficient and a report of the vector coefficient variation reported by the terminal are separately received on different slots in the report setting.

The report setting in this manner may be the same report setting or different report settings. Regardless of the same report setting or different report settings, the reference vector coefficient and the vector coefficient variation have to be received on different slots. A specific processing process is described below.

A timing sequence of operating slots in the report setting of the terminal that reports the reports is determined, and the report of the reference vector coefficient and the report of the vector coefficient variation are received in sequence according to the timing sequence of the operating slots.

In practical applications, the reference vector coefficient may also be specified by the terminal according to historical records. For example, through a negotiation between the terminal and the base station, a vector coefficient in a report reported at a time moment closest to a current moment in the historical records is specified as the reference vector coefficient. In this case, all reports reported by the terminal or received by the receiving apparatus are reports for transmitting vector coefficient variations. After receiving the reports, the receiving apparatus directly parses the corresponding vector coefficient variations and restores the corresponding channel state information.

In the process of determining whether the reference vector coefficient or the vector coefficient variation is transmitted in the received report, a type of the report setting is further detected, where the type includes an aperiodic report setting, a periodic report setting, and a semi-persistent report setting. When the report setting is the aperiodic report setting, the received report is a report for transmitting the reference vector coefficient. If the report setting is the periodic report setting or the semi-persistent report setting, the received report is a report for transmitting the vector coefficient variation.

For the channel state processing apparatus in this embodiment, the channel state information reported by the terminal is reported separately in a set way that the reference vector coefficient and the vector coefficient variation are reported, and the vector coefficient variation is a variation relative to the reference vector coefficient. In a reporting process, the report of the reference vector coefficient is a complete information report, and other reports are to only report variations relative to the reference. Therefore, the apparatus avoids excessive resources occupied when the terminal reports reports, reduces resource occupancy when a receiving end receives reports, reduces an information reading and parsing amount, greatly reduces the energy consumption of the receiving end, and improves the resource utilization rate of the receiving end.

Embodiment Five

Figure 5:
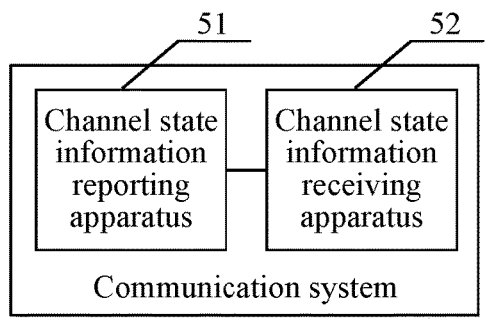
FIG. 5 is a structural diagram of a communication system according to embodiment five of the present disclosure.

Referring to FIG. 5 which is a structural diagram of a communication system provided by this embodiment, the system specifically implements the measurement, reporting, and reception of channel state information through the channel state processing methods in Embodiment one and Embodiment two described above. The system includes a channel state information reporting apparatus 51 and a channel state information receiving apparatus 52. The reporting apparatus 51 mainly implements channel measurement and information reporting through the channel state processing method in Embodiment one described above. The receiving apparatus 52 mainly implements the reception, parsing, and determination of information reported by the reporting apparatus 51 through the channel state processing method in Embodiment two described above.

In this embodiment, the receiving apparatus 52 is configured to generate a configuration parameter and deliver the configuration parameter to the reporting apparatus 51, where the configuration parameter is used for instructing and controlling a terminal to report channel state information. The reporting apparatus 51 receives the configuration parameter sent by the receiving apparatus 52, determines the channel state information according to the configuration parameter, vectorizes the channel state information and determines a reference vector coefficient for reporting the channel state information, determines, according to the reference vector coefficient, a vector coefficient variation of the vectorized channel state information, and reports the reference vector coefficient and the vector coefficient variation separately to the receiving apparatus 52.

In this embodiment, when the reporting apparatus 51 reports the channel state information, the channel state information is specifically reported in the form of reports, and a report for reporting the vector coefficient variation and a report for reporting the reference vector coefficient are different reports.

The receiving apparatus 52 receives a report reported by the reporting apparatus 51, where the report includes the reference vector coefficient or the vector coefficient variation after the channel state information to be fed back determined by the reporting apparatus 51 according to the configuration parameter is vectorized.

Figure 6:
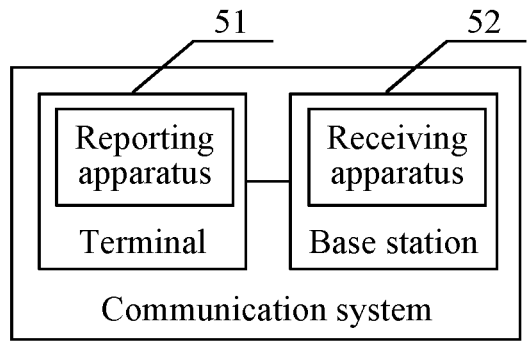
FIG. 6 is another structural diagram of a communication system according to embodiment five of the present disclosure.

In practical applications, as shown in FIG. 6, the system is specifically composed of a terminal 10 and a base station 20, where the terminal 10 is provided with the reporting apparatus 51, and the base station 20 is provided with the receiving apparatus 52. When the base station 20 needs to detect channel state information from the lower-level terminal 10, the base station 20 controls the receiving apparatus 52 to generate a configuration parameter for controlling the terminal 10 to measure the channel state information and delivers the configuration parameter to the terminal 10 via the Internet or in the form of broadcast information.

Figure 9:
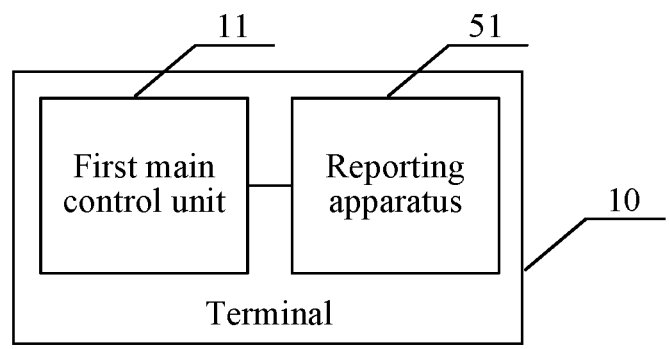
FIG. 9 is a structural diagram of a terminal according to an embodiment of the present disclosure.

In this embodiment, as shown in FIG. 9, the terminal 10 includes a first main control unit 11 and the reporting apparatus 51, where the first main control unit 11 is connected to the reporting apparatus 51 and configured to control the reporting apparatus 51 to perform the channel state processing method in Embodiment one described above. That is, the first main control unit 11 controls the reporting apparatus 51 to receive the configuration parameter from the base station 20 and measure a corresponding channel according to a measurement reference signal in the configuration parameter to obtain the corresponding channel state information.

Figure 10:
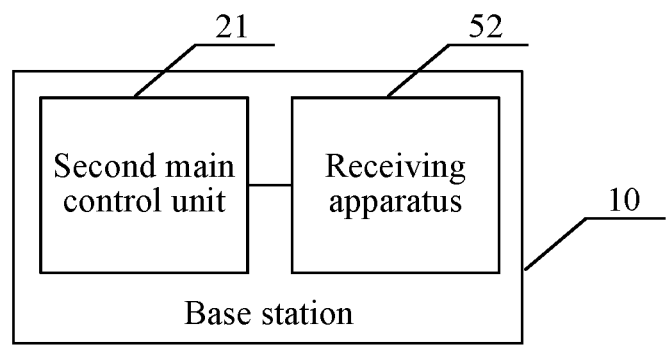
FIG. 10 is a structural diagram of a base station according to an embodiment of the present disclosure.

As shown in FIG. 10, the base station 20 specifically includes a second main control unit 21 and the receiving apparatus 52, where the second main control unit 21 is connected to the receiving apparatus 52 and configured to control the receiving apparatus 52 to perform the channel state processing method according to Embodiment two described above. That is, the second main control unit 21 controls the receiving apparatus 52 to generate the configuration parameter and deliver the configuration parameter to the terminal 10 according to practical conditions.

In this embodiment, the terminal 10 presets a reference for a report for transmitting the channel state information. The reference refers to a reference for vector coefficients when the channel state information is vectorized. After the reference is set, the terminal 10 reports the channel state information to be reported according to the reference.

In this embodiment, the terminal 10 may specifically implement reporting in the following manner: when the reference is just specified in the channel state information to be reported by the terminal, the terminal 10 reports the reference vector coefficient for the channel state information to the base station 20; and when the terminal 10 reports other channel state information, the terminal 10 computes the vector coefficient variation relative to the reference according to the reference and reports the vector coefficient variation to the base station 20. The receiving apparatus 52 in the base station 20 receives a report reported by the terminal 10 and extracts the corresponding channel state information from the report through parsing.

Figure 7:
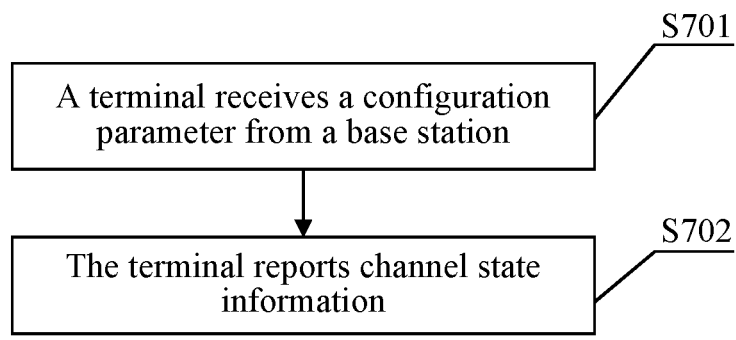
FIG. 7 is a flowchart of channel state information reporting based on a communication system according to embodiment five of the present disclosure.

In this embodiment, the preceding processing methods are described in detail below in conjunction with specific applications. Specific steps are shown in FIG. 7.

In S701, a terminal receives a configuration parameter from a base station.

In S702, the terminal reports channel state information.

In this embodiment, the terminal transmits vector coefficients of the channel state information obtained according to the configuration parameter to the base station through M reports. One of the M reports transmits a reference vector coefficient, and the other reports transmit vector coefficient variations. M is a positive integer greater than 1.

In practical applications, the terminal has to report a report for transmitting the reference vector coefficient and reports for transmitting the vector coefficient variations by using different reports.

In this embodiment, it is to be noted that a vector is a vector related to the channel state information. For example, a linear combination of vectors is used for representing a channel coefficient matrix or a matrix correlated to the channel coefficient matrix or an eigenvector matrix or a precoding matrix. A vector set is predefined; or a vector structure is predefined and the formation of specific vectors is controlled by a parameter; or a candidate vector is predefined; or a candidate vector structure is predefined and the formation of specific candidate vectors is controlled by a parameter. In the case where the vectors for the linear combination are determined, the coefficients of the vectors for the linear combination are fed back by the terminal.

For example, the candidate vector or the vector set is $$v_{l,m} = \left[ u_m, e^{j\frac{2\pi l}{O_1 N_1}} u_m, \ldots, e^{j\frac{2\pi l(N_1-1)}{O_1 N_1}} u_m \right]^T,$$

$$\text{where } u_m = \left[ 1, e^{j\frac{2\pi m}{O_2 N_2}}, \ldots, e^{j\frac{2\pi m(N_2-1)}{O_2 N_2}} \right]^T;$$

where { } {$N_1$, $N_2$, $O_1$, $O_2$} are configuration parameters for the candidate vector and generally configured by the base station for the terminal or pre-agreed through an agreement, $N_1$ denotes the number of antenna ports in a first dimension, $N_2$ denotes the number of antenna ports in a second dimension, $O_1$ denotes an oversampling value of the vector in the first dimension, $O_2$ denotes an oversampling value of the vector in the second dimension; {l,m} is a control parameter of the vector $v_{l,m}$, l denotes a phase rotation step factor of the vector in the first dimension for controlling a phase rotation step in the first dimension; and m denotes a phase rotation step factor of the vector in the second dimension for controlling a phase rotation step in the second dimension. When {l,m} is determined, the specific $v_{l,m}$ is determined. That is, the terminal reports the control parameter or an index number of the candidate vector to determine the vectors for a precoding linear combination. For example, the terminal selects L vectors, and the control parameter of the i-th vector is l=$m_1^{(i)}$, m=$m_2^{(i)}$; where i=0, 1, . . . L−1. The control parameter or the index number of the candidate vector is determined in the following manner:

$$m_1^{(i)} = O_1 n_1^{(i)} + q_1$$

$$m_2^{(i)} = O_2 n_2^{(i)} + q_2;$$

where q1 denotes an offset value of the vector in oversampling in the first dimension, and q2 denotes an offset value of the vector in oversampling in the second dimension.

For example, the precoding linear combination of vectors is as follows:

The precoding when the number of layers is 1 is as follows:

$$W_{q_1,q_2,n_1,b_2,p_1^{(1)},p_1^{(2)},i_{2,1,1}}^{(1)} = W_{q_1,q_2,n_1,b_2,p_1^{(1)},p_1^{(2)},i_{2,1,1}}^{1}.$$

The precoding when the number of layers is 2 is as follows:

$$W^{(2)}_{q_1,q_2,n_1,n_2,p_1^{(1)},p_1^{(2)},i_{2,1,1},p_2^{(1)},p_2^{(2)},i_{2,1,2}} =$$

-continued $$\frac{1}{\sqrt{2}} \left[ W^1_{q_1,q_2,n_1,n_2,p_1^{(1)},p_1^{(2)},i_{2,1,1}} \quad W^2_{q_1,q_2,n_1,n_2,p_2^{(1)},p_2^{(2)},i_{2,1,2}} \right],$$

where $$W^l_{q_1,q_2,n_1,n_2,p_l^{(1)},p_l^{(2)},c_l} = \frac{1}{\sqrt{N_1 N_2 \sum_{i=0}^{2L-1}(p_{l,i}^{(1)}p_{l,i}^{(2)})^2}} \left[ \begin{array}{c} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{array} \right], l = 1, 2;$$

where {$p_l^{(1)}$, $p_l^{(2)}$} corresponds to the amplitudes {$p_{l,i}^{(1)}$, $p_{l,i}^{(2)}$} and {$p_{l,i+L}^{(1)}$, $p_{l,i+L}^{(2)}$} of the coefficient of the ith vector in the lth layer; {$p_{l,i}^{(1)}$, $p_{l,i}^{(2)}$} denotes the amplitude of the coefficient of the ith vector on a corresponding port in one polarization direction, and {$p_{l,i+L}^{(1)}$, $p_{l,i+L}^{(2)}$} denotes the amplitude of the coefficient of the ith vector on a corresponding port in the other polarization direction; $c_l$ corresponds to the phases $\varphi_{l,i}$ and $\varphi_{l+L,i}$ of the coefficient of the ith vector in the l th layer; $\varphi_{l,i}$ denotes the phase of the coefficient of the ith vector on the corresponding port in one polarization direction, and $\varphi_{l+L,i}$ denotes the phase of the coefficient of the ith vector on the corresponding port in the other polarization direction.

In this embodiment, the M reports may specifically be reported in the same report setting. Further, when they are reported in the same setting, the M reports may also be transmitted based on different slots or reported based on different time behavior categories.

Different reports reported based on slots reflect channel states of different time slots, and the reports for reporting the vector coefficient variations reflect time-dependent variations of the channel state information.

The reported reference report is used as a reference for computing the vector coefficient variations in the reports reported later, so as to reduce resource occupancy of the reports sent by the terminal 10.

For example, the coefficient of the vector is K0 at a moment t0 and K1 at a moment t1, and a variation of the coefficient from the moment t0 to the moment t1 is deltaK from K0 to K1. The terminal feeds back the coefficients of the vector at different moments separately using different reports. One report feeds back the coefficient K0 at the moment to, and another report feeds back the coefficient K1 of the vector at the moment t1. A feedback manner is to feed back a variation (i.e., deltaK) of K1 relative to K0. K0 is the reference vector coefficient and deltaK is the vector coefficient variation. In this way, other reports report only the variation deltaK of the channel instead of an unchanged part K0 of the channel, thereby saving reporting overheads.

In practical applications, the coefficient of the vector is generally composed of an amplitude and a phase. To feed back the variation of a vector coefficient is to feed back a variation in amplitude or a variation in phase. Similarly, the reference for reporting is the same amplitude or phase in the vector coefficient reported each time, that is, a reference point for computing the amplitude and the phase.

For example, the amplitude of the coefficient of the vector is K0 at the moment t0 and K1 at the moment t1, and a variation in amplitude of the coefficient from the moment t0 to the moment t1 is deltaK from K0 to K1. The terminal feeds back the coefficients of the vector at different moments using multiple reports. One report feeds back the amplitude K0 of the coefficient at the moment t0, and another report feeds back the amplitude K1 of the coefficient of the vector at the moment t1. The feedback manner is to feed back the variation of K1 relative to K0. K0 is the amplitude of the reference vector coefficient and deltaK is a variation in amplitude of a vector coefficient.

For example, the phase of the coefficient of the vector is K0 at the moment t0 and K1 at the moment t1, and a variation in phase of the coefficient from the moment t0 to the moment t1 is deltaK from K0 to K1. The terminal feeds back the coefficients of the vector at different moments using multiple reports. One report feeds back the phase K0 of the coefficient at the moment to, and another report feeds back the phase K1 of the coefficient of the vector at the moment t1. The feedback manner is to feed back the variation of K1 relative to K0. K0 is the phase of the reference vector coefficient and deltaK is a variation in phase of the vector coefficient.

In this embodiment, the reporting through M reports in step S702 may be implemented in one of manners described below.

(1) The report for transmitting the reference vector coefficient and the report for transmitting the vector coefficient variation belong to a same report setting.

For example, the M reports are obtained by measuring resources included in a resource setting associated with the same report setting, and different reports are obtained based on signals transmitted at different moments on the resource. The report reported later in time is obtained based on a signal transmitted later in time on the resource, that is, the reports are reported according to a sequence of the received reference signals.

For example, the M reports are reported based on the same type of codebook under the configuration of the same report setting.

For example, if the report setting is an aperiodic report setting, the report of the reference vector coefficient is transmitted first and the other reports for transmitting the vector coefficient variations are transmitted thereafter.

For example, if the report setting is a periodic report setting or a semi-persistent report setting, the M reports have the same period, and the report for transmitting the reference vector coefficient has a minimum time offset.

For example, if the report setting is the periodic report setting or the semi-persistent report setting, the M reports are reports in the same period, and the report for transmitting the reference vector coefficient is transmitted first in the same period.

In this way, the use of the same report setting facilitates the comparison of channel states in the same measurement manner and facilitates the reporting of channel variations, thereby saving overheads.

(2) The report of the reference vector coefficient and the report of the vector coefficient variation are transmitted on different slots.

For example, if the report setting is the aperiodic report setting, the report for transmitting the reference vector coefficient is transmitted first and the other reports for transmitting the vector coefficient variations are transmitted thereafter.

For example, if the report setting is the periodic report setting or the semi-persistent report setting, the M reports have the same period, and the report for transmitting the reference vector coefficient has a minimum time offset.

For example, if the report setting is the periodic report setting or the semi-persistent report setting, the M reports are reports in the same period, and the report for transmitting the reference vector coefficient is transmitted first in the same period.

It is to be noted that the vector coefficient variations reflect the variations of the vector coefficient at different moments, that is, channel variations at different moments, so as to reduce the overheads for feeding back channel state information at different moments.

In practical applications, when the terminal 10 transmits the report of the reference vector coefficient and the report of the vector coefficient variation according to a type of the report setting, specifically, a report in the aperiodic report setting transmits the reference vector coefficient, and a report in the periodic or semi-persistent report setting transmits the vector coefficient variation.

For example, the report in the aperiodic report setting transmits the reference vector coefficient, and the report in the periodic or semi-persistent report setting transmits the vector coefficient variation, where the report in the aperiodic report setting and the report in the periodic or semi-persistent report setting are transmitted on different slots.

Alternatively, the report in the aperiodic report setting is transmitted on a slot configured for the report in the periodic or semi-persistent report setting, and the report in the periodic or semi-persistent report setting is not transmitted on this slot.

In this embodiment, after the terminal 10 receives the configuration parameter delivered by the base station 20 to trigger the channel measurement, in some embodiments, the report for transmitting the reference vector coefficient needs to be re-determined, which may specifically be implemented in one of manners described below.

(1) The report for transmitting the reference vector coefficient is determined by using a triggered slot as a reference point according to a timing sequence pre-defined in an agreement or a timing sequence configured by upper-layer signaling.

(2) An aperiodic report is triggered, where the aperiodic report transmits the reference vector coefficient.

For example, the aperiodic report is transmitted by using the triggered slot as the reference point according to the timing sequence pre-defined in an agreement or the timing sequence configured by upper-layer signaling.

For example, the aperiodic report is associated with a periodic or semi-persistent report.

(3) DCI signaling triggers the re-determination of the report for transmitting the reference vector coefficient.

For example, the base station schedules or triggers the aperiodic report by the DCI signaling, where the aperiodic report transmits the reference vector coefficient.

(4) NACK signaling triggers the re-determination of the report for transmitting the reference vector coefficient.

For example, the terminal receives the NACK signaling returned by the base station or failure information and re-determines the report for transmitting the reference vector coefficient.

In practical applications, in some embodiments, the reference may not necessarily be specified and may specifically be determined in manners described below.

(1) A vector coefficient transmitted in the last report in a previous period is used as the reference for vector coefficients transmitted in reports in this period.

For example, when the reports transmitted by the terminal are periodic, reports are reported in one period and in the next period. If the last report in the previous period is transmitted correctly, the vector coefficient transmitted in the last report may be used as the reference for vector coefficients transmitted in reports in a new period.

(2) ACK signaling indicates that a vector coefficient transmitted in a report corresponding to an ACK is used as the reference for vector coefficients transmitted in subsequent reports.

For example, when receiving the ACK signaling corresponding to a transmitted report, the terminal knows that the report is transmitted correctly and may use the vector coefficient transmitted in the report corresponding to the ACK as the reference for the vector coefficients transmitted in the subsequent reports.

(3) The DCI signaling indicates that a vector coefficient transmitted in a transmitted report is used as the reference for vector coefficients transmitted in subsequent reports.

For example, the base station indicates by the DCI signaling the vector coefficient transmitted in a report corresponding to the DCI signaling as the reference for the vector coefficients transmitted in the subsequent reports. Then, the terminal receives the DCI signaling and uses the vector coefficient transmitted in the transmitted report as the reference for the vector coefficients transmitted in the subsequent reports.

In practical applications, to further reduce resources occupied when reports are reported, specifically, the reported vector coefficient variation may be controlled and adjusted. Specific manners are described below.

(1) The vector coefficient variation is reported on a wideband.

For example, the reported vector coefficient variation is applied to the entire reported wideband, which means that the entire reported wideband has the same vector coefficient variation. For example, the vector coefficient variation is reported on the wideband according to a vector, that is, one vector coefficient variation is reported for one vector and applied to the entire wideband. For example, the vector coefficient variation is reported on the wideband according to a layer, that is, one vector coefficient variation is reported for one layer and applied to all vectors other than the strongest vector in the one layer and the entire wideband. For example, one vector coefficient variation is reported to be applied to the entire wideband and all vectors other than the strongest vector in each layer.

(2) The vector coefficient variation is reported on a subband.

For example, the vector coefficient variation is reported according to the subband, that is, the reported vector coefficient variation is applied to a corresponding subband. Alternatively, respective vector coefficient variations on different subbands are reported.

(3) The vector coefficient variation is reported on a variation field of the vector coefficient.

For example, the variation field of the vector coefficient has a value of U0 at the moment t0 and a value of U1 at the moment t1, and the feedback manner is to report a variation from U0 to U1. For example, the variation field is a variation domain of a fast Fourier transformation (FFT) or discrete Fourier transform (DFT) operation or a variation field of an inverse fast Fourier transform (IFFT) or inverse discrete Fourier transform (IDFT) operation. For example, the variation field is a variation field of multiplication by an A matrix, where the A matrix is a Givens matrix or a binary wavelet frame matrix.

(4) The vector coefficient variation is reported according to a vector group, and vectors in the same vector group correspond to the same vector coefficient variation.

For example, vectors are grouped, and coefficient variations corresponding to vectors in groups are reported in correspondence to different vector groups, where the vectors in the same vector group correspond to the same coefficient variation. For example, vectors are grouped according to a layer, vectors in the same layer belong to the same group, and vectors in different layers belong to different groups; and coefficient variations corresponding to vectors in layers are reported in correspondence to different layers, where the vectors in the same layer correspond to the same coefficient variation. For example, vectors are grouped according to a delay size, and coefficient variations corresponding to vectors in groups are reported in correspondence to different vector groups, where the vectors in the same vector group correspond to the same coefficient variation. For example, vectors are grouped according to the values of power or amplitude of the vectors, and coefficient variations corresponding to vectors in groups are reported in correspondence to different vector groups, where the vectors in the same vector group correspond to the same coefficient variation.

In this embodiment, to be convenient for the base station to identify the report reported by the terminal, before the report is reported, a status indicator bit and reporting accuracy of the report are set. The status indicator bit is reported together with the vector coefficient to the base station, so that the base station determines whether the reference vector coefficient or the vector coefficient variation is transmitted in the report received this time according to the status indicator bit in the report and determines a size of the vector coefficient variation according to the set reporting accuracy. In particular, for the control of the variation, the vector coefficient variation may specifically be reported in one of manners described below.

(1) A unit used for reporting the vector coefficient variation is agreed, and a unit includes a size and a direction.

For example, units are agreed respectively for vectors, where the same vector uses the same unit and direction. For example, units are agreed respectively according to a layer, where vectors in the same layer use the same unit and direction. For example, vectors in which variation is reported are agreed to have the same unit.

For example, the unit used for reporting the vector coefficient variation is agreed by Radio Resource Control (RRC) signaling.

For example, the unit used for reporting the vector coefficient variation is agreed by medium access control (MAC) control element (CE) signaling.

For example, the unit used for reporting the vector coefficient variation is agreed by the DCI signaling.

For example, the unit of a coefficient phase variation may be $2\pi/8$ in a positive rotation direction, $2\pi/8$ in a negative rotation direction, $2\pi/4$ in the positive rotation direction, or $2\pi/4$ in the negative rotation direction.

For example, the unit of a coefficient amplitude variation may be 0.1 dB in an increase direction, 0.1 dB in a decrease direction, $\sqrt{1/16}$ in the increase direction, or $\sqrt{1/16}$ in the decrease direction.

(2) One state of one bit indicates that the vector coefficient has varied, and the other state indicates that there is no variation.

For example, 1 indicates that the vector coefficient has varied, and 0 indicates that the vector coefficient has not varied; or 0 indicates that the vector coefficient has varied, and 1 indicates that the vector coefficient has not varied.

For example, state 1 of one bit indicates that the vector coefficient has varied by $2\pi/8$ in phase, and state 0 of one bit indicates that the vector coefficient has not varied in phase. Alternatively, state 0 of one bit indicates that the vector coefficient has varied by $2\pi/8$ in phase, and state 1 of one bit indicates that the vector coefficient has not varied in phase.

For example, state 1 of one bit indicates that the vector coefficient has varied by $2\pi/4$ in phase, and state 0 of one bit indicates that the vector coefficient has not varied in phase. Alternatively, state 0 of one bit indicates that the vector coefficient has varied by $2\pi/4$ in phase, and state 1 of one bit indicates that the vector coefficient has not varied in phase.

(3) A state of one bit indicates the size of the vector coefficient variation in phase.

For example, the state of one bit indicates that the vector coefficient increases by $2\pi/8$ in phase. For example, the state of one bit indicates that the vector coefficient decreases by $2\pi/8$ in phase. For example, the state of one bit indicates that the vector coefficient increases by $2\pi/4$ in phase. For example, the state of one bit indicates that the vector coefficient decreases by $2\pi/4$ in phase.

(4) Three states in which the vector coefficient varies in phase are reported, where the vector coefficient varies in phase by one unit in one direction or by one unit in the other direction or has not varied in phase.

For example, the direction of a phase variation may be a phase increase, a phase decrease, a positive phase, or a negative phase. The size of a phase unit may be $2\pi/8$ or $2\pi/4$.

The reporting accuracy may specifically be set with reference to examples below.

For example, one accuracy is set for reporting a reference coefficient, and another accuracy is set for reporting the coefficient variation. For example, the accuracy for reporting the reference coefficient is set to three bits, and the accuracy for reporting the coefficient variation is set to one bit; or an accuracy for reporting a reference coefficient amplitude is set to three bits, and an accuracy for reporting a coefficient amplitude variation is set to one bit; or an accuracy for reporting a reference coefficient phase is set to three bits, and an accuracy for reporting a coefficient phase variation is set to one bit. That is, the accuracy is distinguished according to the number of bits.

For example, the accuracy for reporting the reference coefficient amplitude is set to $\sqrt{1/32}$, and the accuracy for reporting the coefficient amplitude variation is set to $\sqrt{1/64}$; or the accuracy for reporting the reference coefficient phase is set to $2\pi/4$, and the accuracy for reporting the coefficient phase variation is set to $2\pi/8$. That is, the accuracy is distinguished according to a value size.

For example, one accuracy is set for reporting the reference coefficient, and another accuracy is set for reporting the coefficient variation. The two set accuracies may be the same or different and set by the base station separately and received by the terminal separately; or the accuracies are agreed in an agreement.

The methods and the system provided by the embodiments of the present disclosure are used for reporting and receiving the channel state information. Compared with that in the related art, the reporting method in this embodiment only needs to report the vector coefficient variation to reflect a channel variation and only needs to report once a channel coefficient reference that has not varied, that is, the unchanged channel part does not need to be repeatedly reported, thereby saving vector coefficient reporting overheads and channel state information reporting overheads, improving the utilization rate of reporting resources, and saving the energy of the terminal.

Embodiment Six

Figure 8:
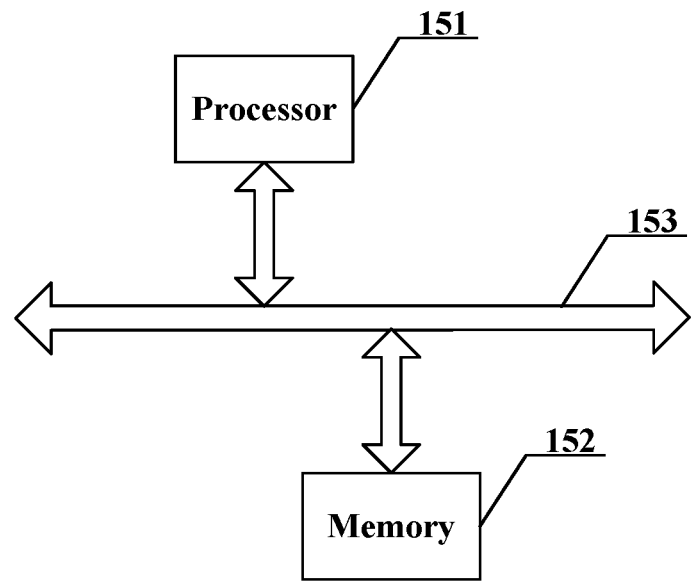
FIG. 8 is a structural diagram of a communication apparatus according to embodiment six of the present disclosure.

This embodiment provides a communication apparatus. As shown in FIG. 8, the communication apparatus includes a processor 151, a memory 152, and a communication bus 153. The communication bus 153 is configured to implement a communication connection between the processor 151 and the memory 152. The processor 151 is configured to execute one or more first programs stored in the memory 152 to implement the following steps: receiving a configuration parameter sent by a base station; determining channel state information according to the configuration parameter; vectorizing the channel state information, and determining a reference vector coefficient for the channel state information; determining, according to the reference vector coefficient, a vector coefficient variation of the vectorized channel state information; and reporting the vector coefficient variation and the reference vector coefficient separately.

In this embodiment, the vector coefficient variation and the reference vector coefficient are specifically reported in the form of reports, and a report for reporting the vector coefficient variation and a report for reporting the reference vector coefficient are different reports.

The processor 151 is configured to execute the one or more first programs stored in the memory 152 to implement the following steps: generating the configuration parameter, where the configuration parameter is used for triggering and controlling a terminal to measure the channel state information; delivering the configuration parameter to the terminal; and receiving a report reported by the terminal, where the report includes the reference vector coefficient or the vector coefficient variation after the channel state information determined by the terminal according to the configuration parameter is vectorized.

This embodiment further provides a computer-readable storage medium. The computer-readable storage medium includes volatile or nonvolatile, removable or non-removable media implemented in any method or technology for storage of information (such as computer-readable instructions, data structures, computer program modules, or other data). The computer-readable storage medium includes, but is not limited to, a random access memory (RAM), a read-only memory (ROM), an electrically erasable programmable read only memory (EEPROM), a flash memory, or other memory technologies, a compact disc read-only memory (CD-ROM), a digital video disc (DVD) or other optical disc storage, a magnetic cassette, a magnetic tape, disk storage or other magnetic storage apparatuses, or any other medium used to store desired information and accessible by a computer.

The computer-readable storage medium in this embodiment may be configured to store one or more first computer programs, where the one or more first computer programs are executable by a processor to implement at least one step of the channel state processing method in Embodiment one described above.

The computer-readable storage medium in this embodiment may be configured to store one or more second computer programs, where the one or more second computer programs are executable by a processor to implement at least one step of the channel state processing method in Embodiment two described above.

This embodiment further provides a computer program which may be distributed on a computer-readable medium and executed by a computing apparatus to implement at least one step of the channel state processing method in Embodiment one described above or at least one step of the channel state processing method in Embodiment two described above. In some cases, the at least one illustrated or described step may be performed in sequences different from those described in the above embodiments.

This embodiment further provides a computer program product including a computer-readable apparatus on which the computer program described above is stored. In this embodiment, the computer-readable apparatus may include the computer-readable storage medium described above.

In summary, according to the channel state processing method and apparatus, the system, the terminal, the base station, and the storage medium provided by the embodiments of the present disclosure, the terminal side performs the channel measurement according to the configuration parameter sent by the base station and determines the corresponding channel state information, vectorizes the channel state information, determines the reference vector coefficient for the channel state information, computes, according to the reference vector coefficient, the vector coefficient variation of the channel state information to be fed back, and finally reports the vector coefficient variation and the reference vector coefficient to the base station separately through different reports. The terminal reports the measured channel state information to be reported separately in the set way that the reference vector coefficient and the vector coefficient variation are reported, and the vector coefficient variation is the variation relative to the reference vector coefficient. In the reporting process, the report of the reference vector coefficient is a complete information report, and other reports are to only report variations relative to the reference. Compared with the reporting method in the related art, the present application only needs to report the vector coefficient variation to reflect the channel variation without repeatedly reporting the unchanged channel coefficient reference, that is, it is unnecessary to report the unchanged channel part, thereby saving vector coefficient reporting overheads and channel state information reporting overheads, and improving the utilization rate of reporting resources.

Further, in the embodiments of the present disclosure, the status indicator bit is also set in the report to mark whether the reported channel state information is the vector coefficient variation, and the terminal selects to report the reference vector coefficient or the vector coefficient variation according to different types of report setting, so that the base station can quickly identify and restore the received channel state information, greatly improving the base station's coding and parsing of channel state information. Since the report received by the base station transmits a variation of the channel state information, the base station's resources occupied by reports are reduced and the resource utilization rate is improved.

It can be seen that those skilled in the art should understand that functional modules/units in all or part of the steps of the method, the system and the apparatus disclosed above may be implemented as software (which may be implemented by computer program codes executable by a computing apparatus), firmware, hardware and appropriate combinations thereof. In the hardware implementation, the division of the functional modules/units mentioned above may not correspond to the division of physical components. For example, one physical component may have multiple functions, or one function or step may be performed jointly by several physical components. Some or all physical components may be implemented as software executed by processors such as central processing units, digital signal processors or microcontrollers, may be implemented as hardware, or may be implemented as integrated circuits such as application-specific integrated circuits.

In addition, as is known to those of ordinary skill in the art, a communication medium generally includes computer-readable instructions, data structures, computer program modules or other data in modulated data signals such as carriers or other transmission mechanisms and may include any information delivery medium. Therefore, the present application is not limited to any particular combination of hardware and software.

The above content is a more detailed description of the embodiments of the present disclosure in conjunction with specific implementations, and the specific implementation of the present application is not limited to the description. For those of ordinary skill in the art to which the present application pertains, a number of simple deductions or substitutions may be made without departing from the concept of the present application and should fall within the scope of the present application.

What is claimed is:

1. A channel state processing method applied to a terminal, comprising:
   receiving a configuration parameter sent by a base station;
   determining channel state information according to the configuration parameter;
   vectorizing the channel state information, and determining a reference vector coefficient for the channel state information; wherein vectorizing the channel state information comprises:
   selecting vectors that embody the channel state information from preset candidate vectors, and determining coefficients of the vectors;
   determining, according to the reference vector coefficient, a vector coefficient variation of the vectorized channel state information, wherein the vector coefficient variation is a variation relative to the reference vector coefficient; and
   reporting the vector coefficient variation and the reference vector coefficient separately;
   wherein the reporting the vector coefficient variation and the reference vector coefficient separately comprises: reporting the vector coefficient variation and the reference vector coefficient in a form of reports, wherein the vector coefficient variation and the reference vector coefficient are reported in at least two reports respectively.

2. The method of claim 1, wherein the configuration parameter at least comprises a report setting;
   wherein reporting the vector coefficient variation and the reference vector coefficient in the form of reports comprises:
   reporting the reference vector coefficient and the vector coefficient variation separately through different reports to the base station in a same report setting; or
   reporting the report of the reference vector coefficient and the report of the vector coefficient variation separately to the base station on different slots in the report setting.

3. The method of claim 1, wherein the configuration parameter at least comprises information about a measurement reference signal for the channel state information and a report setting;
   wherein reporting the vector coefficient variation and the reference vector coefficient in the form of reports comprises:
   in the report setting, reporting a report of a reference vector coefficient corresponding to the measurement reference signal and a report of a vector coefficient variation corresponding to the measurement reference signal according to a chronological order of received information about the measurement reference signal, wherein the report of the reference vector coefficient has priority over the report of the vector coefficient variation.

4. The method of claim 1, wherein the configuration parameter at least comprises a type of a report setting in which the channel state information is reported, wherein the type of the report setting comprises an aperiodic report setting, a periodic report setting, and a semi-persistent report setting;

wherein the reporting the vector coefficient variation and the reference vector coefficient in the form of reports comprises:

in the aperiodic report setting, transmitting the report of the reference vector coefficient to the base station; and in the periodic report setting or the semi-persistent report setting, transmitting the report of the vector coefficient variation to the base station.

5. The method of claim 1, wherein the determining the reference vector coefficient for the channel state information comprises:

acquiring historical records of channel state information reported by the terminal; and selecting a vector coefficient reported at a time moment closest to a current moment from the historical records as the reference vector coefficient; or determining a reported report indicated by trigger signaling delivered by the base station, and using a vector coefficient in the reported report indicated by the trigger signaling as the reference vector coefficient, wherein the trigger signaling comprises at least one of: downlink control information (DCI) signaling, DCI format signaling, acknowledgement (ACK) signaling, or non-acknowledgement (NCK) signaling.

6. The method of claim 1, wherein after the determining, according to the reference vector coefficient, the vector coefficient variation of the vectorized channel state information, the method further comprises:

setting a status indicator bit, wherein the status indicator bit is used for indicating whether a reported vector coefficient has varied or a value of the reported vector coefficient variation.

7. A channel state processing method applied to a base station, comprising:

generating a configuration parameter, wherein the configuration parameter is used for instructing and controlling a terminal to report channel state information;

delivering the configuration parameter to the terminal; and receiving a report reported by the terminal, wherein the report comprises a reference vector coefficient or a vector coefficient variation after the channel state information determined by the terminal according to the configuration parameter is vectorized, and the vector coefficient variation and the reference vector coefficient are reported in at least two reports respectively; wherein the vector coefficient variation is a variation relative to the reference vector coefficient;

wherein the channel state information determined by the terminal according to the configuration parameter is vectorized by selecting vectors that embody the channel state information from preset candidate vectors, and determining coefficients of the vectors.

8. The method of claim 7, wherein the configuration parameter at least comprises a report setting;

wherein the receiving the report reported by the terminal comprises:

receiving a report of the reference vector coefficient and a report of the vector coefficient variation reported by the terminal separately in a same report setting; or receiving a report of the reference vector coefficient and a report of the vector coefficient variation reported by the terminal separately on different slots in the report setting.

9. The method of claim 7, wherein the configuration parameter at least comprises a type of a report setting in which the channel state information is reported, wherein the type of the report setting comprises an aperiodic report setting, a periodic report setting, and a semi-persistent report setting;

wherein the receiving the report reported by the terminal comprises:

in response to the report setting being the aperiodic report setting, receiving a report of the reference vector coefficient; and in response to the report setting being the periodic report setting or the semi-persistent report setting, receiving a report of the vector coefficient variation.

10. The method of claim 7, wherein after the receiving the report reported by the terminal, the method further comprises:

detecting a status indicator bit in the report; and determining, according to the status indicator bit, whether a vector coefficient transmitted in the report has varied or a value of the vector coefficient variation transmitted in the report.

11. A channel state information reporting apparatus, comprising a processor and a storage device, wherein the storage device stores processor-executable programs, and the programs comprise:

a first receiving module, which is configured to receive a configuration parameter sent by a base station;

a measurement module, which is configured to determine channel state information according to the configuration parameter;

a conversion module, which is configured to vectorize the channel state information and determine a reference vector coefficient for the channel state information; wherein the conversion module is further configured to select vectors that embody the channel state information from preset candidate vectors, and determine coefficients of the vectors to vectorize the channel state information;

a computation module, which is configured to determine, according to the reference vector coefficient, a vector coefficient variation of the vectorized channel state information, wherein the vector coefficient variation is a variation relative to the reference vector coefficient; and a first sending module, which is configured to report the vector coefficient variation and the reference vector coefficient separately;

wherein the first sending module is further configured to report the vector coefficient variation and the reference vector coefficient in a form of reports, wherein the vector coefficient variation and the reference vector coefficient are reported in at least two reports respectively.

12. A communication apparatus, comprising a processor, a memory, and a communication bus; wherein the communication bus is configured to implement a communication connection between the processor and the memory;

the processor is configured to execute at least one first program stored in the memory to implement the channel state processing method of claim 1.

13. A non-transitory computer-readable storage medium storing at least one first computer program and at least one second computer program, wherein the at least one first computer program is executable by at least one processor to implement the channel state processing method of claim 1.

14. A communication apparatus, comprising a processor, a memory, and a communication bus; wherein the communication bus is configured to implement a communication connection between the processor and the memory;

the processor is configured to execute at least one first program stored in the memory to implement steps of the channel state processing method of claim 7.

15. A non-transitory computer-readable storage medium storing at least one first computer program and at least one second computer program, wherein the at least one first computer program is executable by at least one processor to implement the channel state processing method of claim 7.

* * * * *